Patented Sept. 26, 1922.

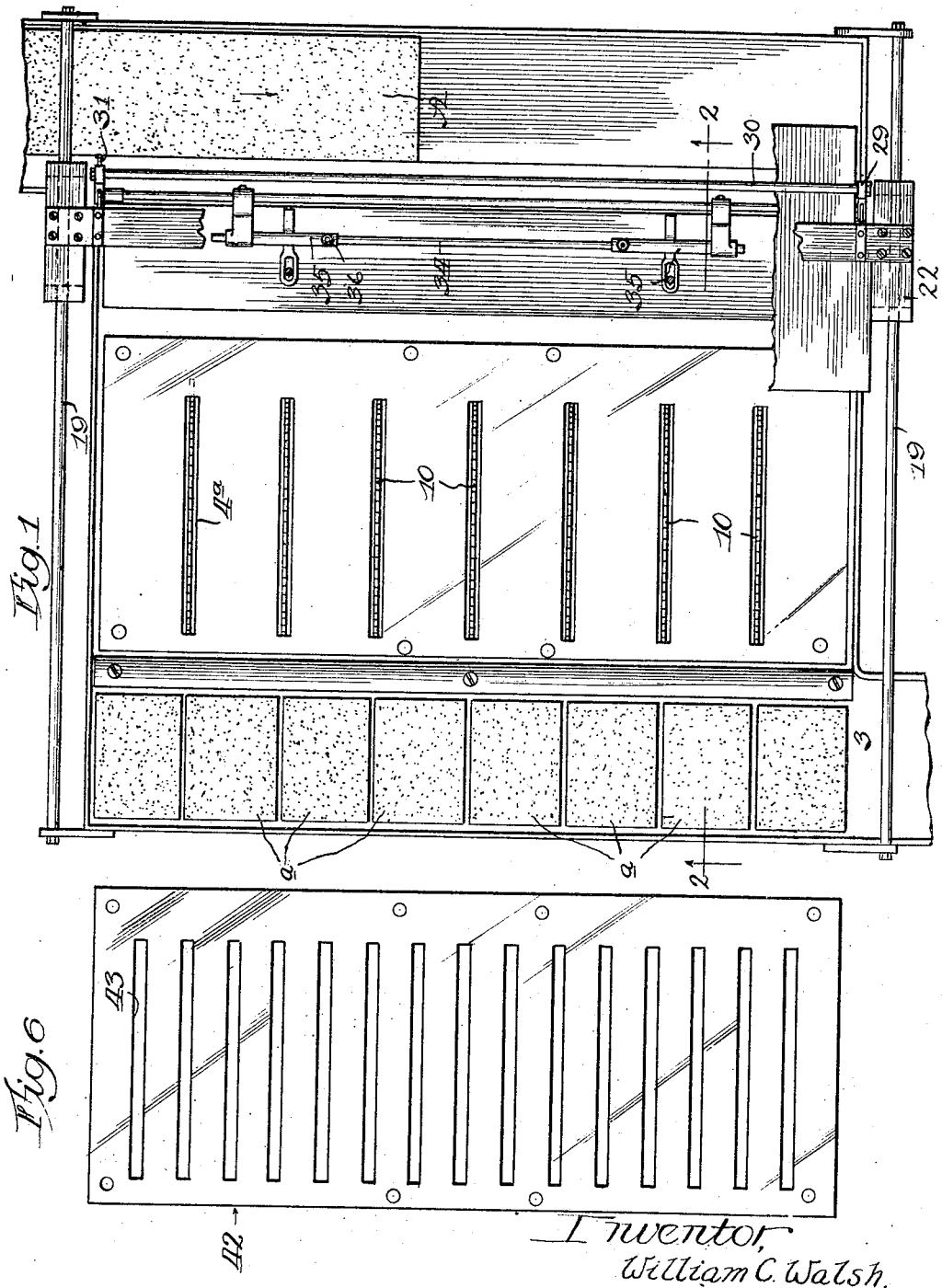

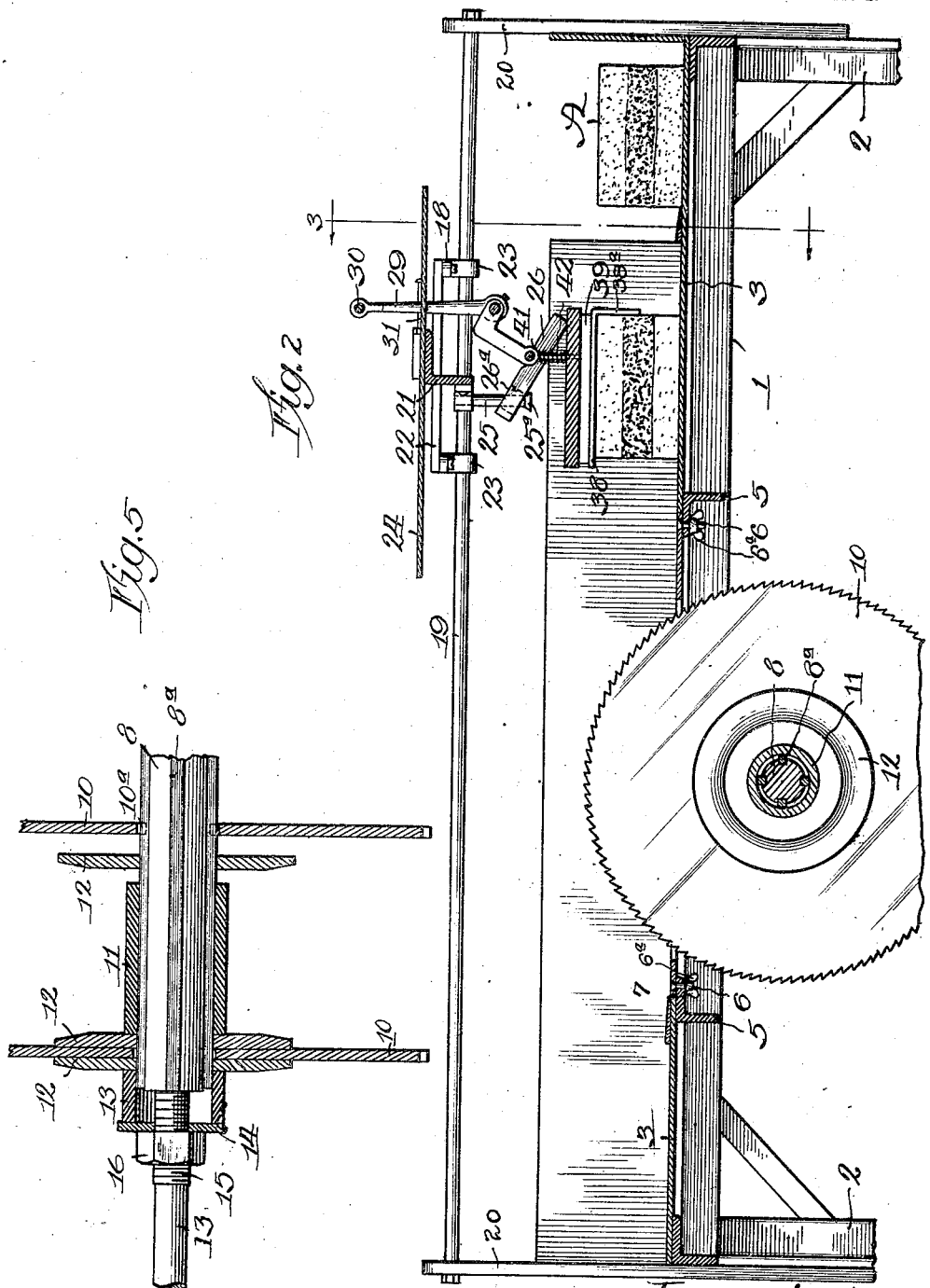

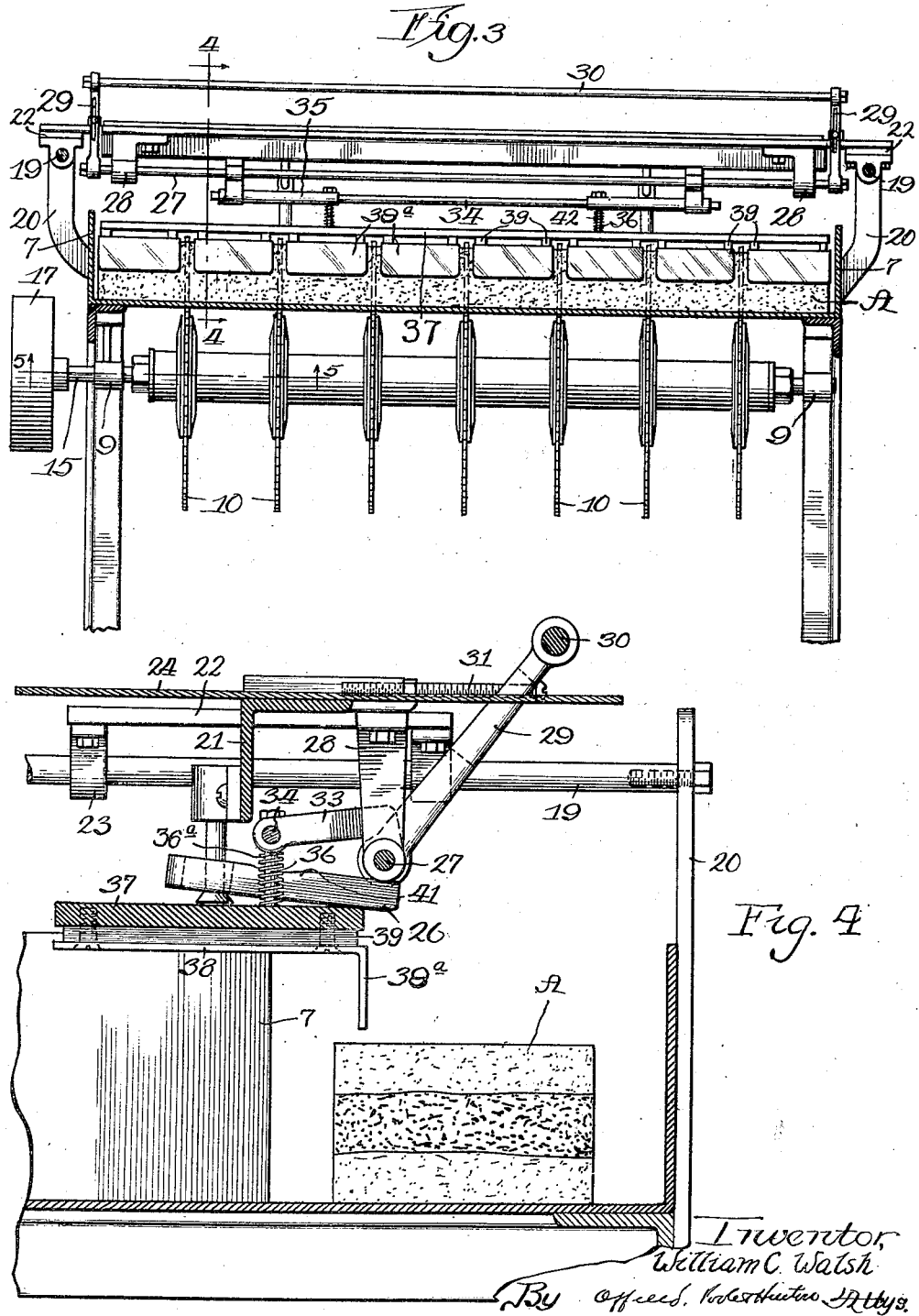

1,430,342

UNITED STATES PATENT OFFICE.

WILLIAM C. WALSH, OF CHICAGO, ILLINOIS.

MACHINE FOR CUTTING BRICK ICE CREAM.

Application filed July 22, 1921. Serial No. 486,702.

*To all whom it may concern:*

Be it known that I, WILLIAM C. WALSH, a citizen of the United States, and a resident of Chicago, in the county of Cook and State of Illinois, have invented certain new and useful Improvements in Machines for Cutting Brick Ice Cream, of which the following is a specification.

This invention relates to improvements in machines for cutting brick ice cream, and more particularly to a machine designed to be used by manufacturers of ice cream for cutting relatively large bricks of ice cream into smaller sized bricks of predetermined size to be packaged and placed upon the market, the customary size of a brick being that equivalent to one quart of the frozen product.

A large proportion of ice cream manufactured is distributed in brick form, this being perhaps the most convenient method of retailing the product. Brick ice cream is preferably wrapped and packaged by the manufacturer by a process that involves the reducing of large masses of the frozen product into bricks of predetermined size. It is manifestly desirable that this process be accomplished in a rapid and efficient manner, not only from the standpoint of increased production, but because of the very nature of the product.

The demand for means which will produce the bricks in a form for packaging, has therefore led to the use of high speed circular saws especially for this particular purpose, and incorporated in a machine including, among other parts, means for successively advancing large bricks, as they are discharged from the molds in which the product is hardened, into contact with and through the saws.

The utilization of a circular saw is well within the realm of ice cream cutting operations, because the comparative hardness of the cream in its frozen state requires a cutting medium which will cut the frozen product rapidly and deliver a large number of bricks to be packaged at a high rate of speed. The problem of cutting ice cream by the use of circular saws is not altogether a simple one, because of the nature of the ingredients of the ice cream, and its extremely low temperature. For this reason the material of which the saws are made must be non-corrosive and neutral so far as chemical action is concerned, in order that the product will not be contaminated by contact with the metal. Furthermore, the saws must undergo extreme variations in temperature, and therefore the saws must be proof against buckling or warping under the effects of temperature changes.

The invention is therefore to provide a machine incorporating the suggestions hereinbefore stated, and which will perform the function for which it is intended, with accuracy and dispatch.

In the accompanying drawings, a preferable type of machine is illustrated, and the same may be described as follows:

Fig. 1 is a top plan view of the machine showing the saw table and the advancing carriage, Fig. 2 is a view in vertical section taken on line 2—2 of Figure 1, Fig. 3 is a view in vertical transverse section taken on line 3—3 of Figure 2, Fig. 4 is an enlarged detailed view in vertical section taken on line 4—4 of Figure 3, Fig. 5 is a detailed view in cross-section taken on line 5—5 of Figure 3, showing the construction of the saw spindle, and Fig. 6 is a top plan view of the plate which may be substituted for the purpose of cutting the bricks into still smaller parts, if desired.

The machine comprises in general a table consisting of a horizontal rectangular frame 1 preferably made of angle iron and supported at each corner by vertical legs 2. The surface of the table consists of sections or plates 3 supported upon the frame. The central section or plate 4 intermediate the end sections of the table is slotted and removable, the same co-operating with a series of circular saws hereinafter to be described. The slotted plate 4 is preferably supported upon transverse frame members 5—5, and secured thereto by means of bolts 6 extending through the horizontal webs of said frame memebrs 5, and wing nuts 6ª—6ª. Along the sides of the table are vertical side plates 7—7 extending above the table surface.

Extending transversely of the table, and intermediate the ends thereof, is mounted a horizontal shaft or spindle 8 journalled at its ends in suitable bearings 9—9 located immediately below the surface of the table. Spaced at equal distances along the spindle 8 is a series of circular saws 10 having relatively fine saw teeth which project upwardly through slots 4ª formed in the removable plate 4, and a considerable distance above the surface of the table. As clearly shown in Figures 2 and 5, the saws 10 are keyed upon the spindle 8 by means of longitudinal splines or grooves 8ª cut in the surface of the spindle and engaged by lugs or teeth 10ª projecting from the central opening in the saws. Each saw is spaced from the adjacent saw by means of a spacing sleeve 11 which abuts at its ends against spacing discs 12 which in turn bear flatwise against the face of the adjacent saws. The discs act primarily to reinforce the saws at their central portions. Beyond the endmost saw is provided a somewhat shorter spacing collar 13 against which bears a washer 14 mounted on a reduced nut or journal 15 of the spindle, the latter having a screw threaded portion 15ª immediately adjacent the end of the spindle, there being carried on said screw threaded portion a nut 16 adapted to be screwed tightly against the washer 14 which in turn forces the spacing collar 13 against the adjacent disc 12, thus tightly forcing all of the spacing collars and discs together forming a rigid structure throughout. It is to be understood that the same construction is repeated at the opposite end of the saw spindle 8. At one end of the spindle 8 and mounted upon one of the reduced end portions 15 thereof is a pulley 17 adapted to receive a belt for the purpose of driving the saw spindle. Although a pulley and belt type of drive is herein disclosed, it is understood that any suitable type of drive may be used. As already suggested, the saws are carefully made from a selected grade of steel which is non-corrosive, rustproof, and proof against distortion or warping under changing temperature conditions.

By way of explanation (Figure 2) the right hand end of the table may be considered the feed end of the machine, and the left hand end the discharge end; that is to say, large bricks of ice cream to be cut are delivered onto the table at the right end, advanced through the saws, and discharged or removed from the table at the left end to be wrapped and packaged. Referring now to the feeding mechanism, the same comprises a carriage 18 slidable lengthwise of the table and supported upon horizontal rods 19—19 supported at their ends by pairs of upright arms 20—20 mounted at the ends of the table frame, and offset laterally a short distance beyond the sides of said table, as clearly shown in Figure 3. The rods 19 are located above the saws 10 so that the path of the carriage is also above the saws. The operative parts carried by the carriage depend or are suspended from the carriage frame comprising a transverse frame member 21 extending the width of the table, and secured at its ends to crossplates 22 at the ends of which are mounted sliding blocks 23—23 engaging the rods 19—19. The transverse frame member 21 is L-shaped in cross-section, and supports upon its horizontal web a guard plate 24 extending horizontally in either direction from the frame member 21, and serving to protect the operator from the frozen material which is thrown upwardly during the cutting operation. Depending from the transverse frame member 21 of the carriage and spaced inwardly from either end thereof, is a pair of posts 25 having enlarged heads 25ª at their lower ends. These posts loosely support arms 26—26 extending in a general direction toward the feeding end of the machine, and are provided with elongated slots 26ª at their forward ends, which engage the depending posts 25. As will presently be pointed out, these arms act as levers, co-operating with the brick engaging parts of the carriage now to be described.

Extending transversely of the table, and a short distance below the slide rods 19—19, is a shaft 27 journalled in depending bearing brackets 28—28 secured to the under side of the transverse frame member 21, and adjacent the ends thereof. The ends of the shaft 27 project beyond the brackets 28—28, and at the ends thereof are mounted upwardly extending lever arms 29—29 connected together at their upper ends by means of an operating handle 30 extending throughout the width of the machine. This handle is grasped by the operator in operating the brick advancing mechanism, as well as for sliding the carriage toward and from the saws. As a preferable construction, the levers 29—29 are slotted longitudinally adjacent their upper ends, and engage a set screw 31 adjustably anchored in the block 32 secured to the transverse frame member 21 above the guard plate 24, said set screw 31 being capable of longitudinal adjustment and adapted to limit the backward throw of the lever arms 29—29, and thus limit the upward movement of the brick engaging parts of the carriage.

Fixed to the shaft 27 at equal distances inwardly from the ends thereof is a pair of bell crank levers 33, each comprising a short and a long arm, the latter extending horizontally in a forward direction, and supporting at their ends a rod 34 shorter than the shaft 27, and located a short distance forwardly thereof. Extending inwardly from the ends of the bell crank levers 33—33 are sleeves 35—35 which carry at their inner ends downwardly extending bolts 36—36 loosely mounted or connected. A horizontal plate 37 extending transversely of the carriage is supported by said bolts 36—36, which are anchored between said plate, forming the main part of the brick engaging member. Surrounding each bolt is a coil spring 36ª—36ª bearing at its ends against the plate 37, and sleeves 35—35, their function being to yieldingly resist the relative movement of the plate and sleeves toward each other, it being obvious that the bolts support the plate in suspended position, but being loose do not hold the plate rigid. On the under side of the plate 37 is a series of parallel pusher plates 38 arranged transversely of the plate 37, and spaced apart in parallel relation with each other at a short distance from the under side of the plate by the introduction of spacer blocks 39. At the rear end of each plate 38 is a downwardly extending flange 38ª acting to engage the rear side of each brick as the same is picked up by the carriage and moved forwardly toward the saws. As clearly shown in Figure 3, each plate 38 and its rear flange 39 occupies the space between the saws, so that after the brick has been cut, each pusher plate 38 has engagement with an individual brick. The spacer blocks 39 likewise permit the saws to pass completely through the brick without danger of striking the supporting plate 37. The function of the handle 30 and lever arms 29—29 already mentioned is to effect the raising and lowering of the brick engaging members of the carriage during the forward and rearward movement of the carriage, the brick engaging members being raised during the return stroke and lowered at the end thereof to "pick up" the next brick to be advanced through the saws. In Figure 4 the parts of the carriage are shown in brick releasing position with a brick 40 in position to be engaged thereby. It is to be noted that the lever arms 29 are thrown rearwardly, thereby acting to rotate the bell crank levers 33—33 which in turn raise the plate 37 upwardly above the path of the brick 40. The carriage is now in position to be moved rearwardly until the rear flange 38ª of the pusher plates 38 pass rearwardly of the brick 40, whereupon the plate 37 is lowered and the pusher plates engage the brick, as shown in Figure 2, this being accomplished automatically as the operator pushes forwardly on the handle 30 to slide the carriage in the same direction.

At this point, the function of the loosely mounted arms 26—26 may be discussed. It is to be observed that the same rest loosely upon the plate 37 adjacent the rear edge thereof, and are rotated about their forward ends and at their point of connection with the depending post 25, by the upward and downward movement of said plate. At the same time the arms pass beneath the transverse rod 34 in such a manner that said rod strikes the arms 26 along their upper edges and substantially midway between their ends. At the point of contact, the arms are provided with notches or depressions 41 which act to form a partial connection between the arms and said rod. The arms 26 function during the forward movement of the carriage, and in the brick engaging position of the plate 37 as is clearly shown in Figure 2, the same bearing downwardly against the plate 37 adjacent its rear edge, transmitting the pressure indirectly from the rod 34 to said plate. During the forward movement of the carriage, the force carrying the plate 37 and the brick engaging members in the same direction, is also transmitted through the arms 26, the engagement of the notches 41—41 and the rod 34 preventing the sliding of the latter along said arms. From this it is seen that pressure is not transmitted directly to the plate in the movement of the levers 29 and connecting bolts, but indirectly through the loosely mounted arms 26; inasmuch as the connection between the rod 34 and the plate 37 is a yielding one through the medium of the coil springs 36ª—36ª surrounding the loose bolts 36—36, the result being that the lifting of the plate 37 is accomplished by means of the connecting bolts, whereas the lowering of the plate and the pressure exerted thereon is transmitted through the medium of the arms 26—26. While the plate 37 is in raised position and out of brick engaging position, the arms 26—26 are disconnected from the rod 34 and are carried upwardly into a substantially horizontal position, as shown in Figure 4, their lower edges sliding along the rear edge of the plate 37, it being manifest that in this position the plate 37 is supported in raised position by means of the connecting bolt 36.

The operation of the machine will be clearly understood from the following: The bricks A are preferably of a length equal to the width of the table, and are fed onto the table from one side as indicated in Figure 1. The feeding of each brick is accomplished during the forward movement of the preceding brick toward the saws, so that upon the completion of the cutting operation the carriage may be drawn rearwardly to engage the succeeding brick. The entire movement of the carriage, as well as the raising and lowering of the brick engaging parts thereof, is accomplished entirely through the lever arms 29 and handle 30. Thus when the operator pulls on the handle 30 in the act of drawing the carriage rearwardly, the lever arms 29 are simultaneously swung rearwardly to the position shown in Figure 4, and the brick engaging members are simultaneously raised, thus releasing the brick. When the carriage has reached its rearmost position, the operator pushes forwardly on the handle, thus starting the carriage forwardly, and at the same time lowering the brick engaging members in contact with the brick to be advanced. Thus it is seen that the entire cutting operation is merely a forwardly and rearwardly reciprocation of the carriage carrying successive bricks forwardly through the saws, each forward movement accomplishing the cutting of a large brick A into a number of smaller bricks $a$ of the proper size for wrapping, as clearly shown in Figure 1.

In a machine such as herein illustrated and described, provision is made for varying the size of the bricks into which the larger bricks may be cut. The adjustable feature of the saws has already been pointed out in connection with Figure 5, whereby any number of saws may be mounted on the spindle 8, and spaced apart any predetermined distance by the use of spacing collars 11 of different lengths. Assuming, therefore, that it is desired to alter the machine saws to cut bricks of smaller size, the proper number of saws would first be mounted on the spindle, and spaced apart to the desired width, and then a plate would be substituted for the plate 4 already described, which would correspond with the adjusted arrangement of saws. Such a plate 42 is shown in Figure 6, having a series of slots 43 for the saws, which have the same arrangement of spacing as the saws upon the spindle 8. This plate is connected with the table in the same manner as described in connection with the removable plate 4.

Having described and illustrated a preferred construction for the machine embodying the invention, I claim:

1. In a machine of the character described, the combination of a table, a saw having a cutting edge above the surface of the table, a carriage comprising a brick engaging member, and means for lowering said brick engaging member into brick engaging position during the movement of the carriage in one direction, and for raising the same from brick engaging position during its movement in the opposite direction.

2. In a machine of the character described, the combination of a table, a saw having a cutting edge above the surface of the table, a carriage slidable toward and from said saw, and comprising a brick engaging member, and means for lowering said brick engaging member during the movement of the carriage toward said saw and for raising the same during its movement in the opposite direction.

3. In a machine of the character described, the combination of a table, a saw having a cutting edge projecting above the surface of the table, a carriage movable along said table above said saw and comprising brick engaging members adapted to be lowered into brick engaging position during the movement of said carriage in one direction, and to be raised out of brick engaging position during the movement in the opposite direction.

4. In a machine of the character described, the combination of a table, a saw having a cutting edge projecting above the surface of the table, a carriage movable along said table above said saw and comprising brick engaging members, and means operative to shift said members into and out of brick-engaging position during the movement of said carriage in opposite directions toward and from said saw.

5. In a machine of the character described, the combination of a table, a saw projecting above the table surface, a carriage movable parallel to the table surface above the saw, and comprising brick engaging members, a lever operatively connected with said brick engaging members, and operative to lower said brick engaging members in the movement of said carriage in one direction, and to raise the same in the movement of said carriage in the opposite direction.

6. In a machine of the character described, the combination of a table, a circular cutting saw mounted beneath said table, and projecting upwardly through a slot in the table surface, a carriage movable parallel to the table surface above the saw, and comprising brick engaging members, a handle operatively connected with said brick engaging members, and operative to lower said brick engaging members in the movement of said carriage in one direction, and to raise the same in the movement of said carriage in the opposite direction.

7. In a machine of the character described, the combination of a table, a circular cutting saw mounted beneath said table, and projecting upwardly through a slot in the table surface, a carriage movable parallel to the table surface above the saw, and comprising a pusher plate, a lever operatively connected with said plate, and adapted to be shifted forwardly and rearwardly in the corresponding movement of said carriage, to raise and lower said pusher plate out and into brick engaging position.

8. In a machine of the character described, the combination of a table, a plurality of circular saws arranged in predetermined spaced relation mounted on a spindle adjacent the surface of said table, a carriage mounted on said table, and movable at right angles to the axis of said spindle and comprising a plurality of pusher plates corresponding to and in alignment with the spaces between said saws, and adapted to engage a brick to be cut during the movement of the carriage toward said saws, and means acting during the movement of said carriage in the opposite direction to raise said pusher plates from brick engaging position.

9. In a machine of the character described, the combination of a table, a plurality of circular saws arranged in predetermined spaced relation mounted on a spindle adjacent the surface of said table, a carriage mounted on said table and movable at right angles to the axis of said spindle, and comprising a plurality of pusher plates corresponding to and in alignment with the spaces between said saws, and adapted to engage a brick to be cut during the movement of the carriage toward said saws, and a lever handle adapted to be grasped to move the carriage toward and from said saws, and to be swung relative to said carriage at the end of each stroke thereof to alternately raise and lower said pusher plate out of and into brick engaging position.

10. In a machine of the character described, the combination of a table, a rotative saw mounted to cut a brick of frozen material advanced along the surface of said table into contact with said saw, and means for advancing successive bricks to and beyond said saw, comprising pusher plate mounted to slide above said table surface, and a lever operatively connected with said pusher plate and adapted to be grasped by the operator to move said carriage, and to simultaneously lower said pusher plate into brick engaging position at the commencement of its forward stroke, and to raise the same at the commencement of its return stroke.

11. In a machine of the character described, the combination of a table, a rotative saw mounted to cut a brick of frozen material advanced along the surface of said table into contact with said saw, and means for advancing successive bricks to and beyond said saw, comprising a reciprocating pusher plate adapted to advance successive bricks into contact with the saws, and a lever operatively connected with said plate to raise said pusher plate out of brick engaging position at the end of the advancing stroke, and to lower said plate at the end of the return stroke, a yielding member acting on said plate during its brick engaging position and means for indirectly transmitting the pressure exerted by said lever upon said plate.

12. In a machine of the character described, the combination of a table, a spindle mounted beneath said table, a plurality of circular saws mounted in predetermined spaced relation along said spindle, a portion of the saw blades extending through slots in the table surface, a carriage movable above the surface of the table parallel with the planes of said saws, and comprising brick engaging members suspended therefrom and consisting of a series of pusher plates located in alignment with the spaces between said saws, yieldable means acting on said plates to hold the same in brick engaging position, and a lever operatively connected with said plate and operative in the act of moving said carriage in one direction to raise said plates from brick engaging position against the tension of said yieldable means.

13. In a machine of the character described, the combination of a table, a plurality of circular saws mounted in predetermined spaced relation transversely of said table, a carriage movable above the surface of the table parallel with the planes of said saws, and comprising a supporting plate suspended therefrom, a plurality of pusher plates mounted on said plate and arranged in alignment with the spaces between said saws, a spring acting on said supporting plate to hold the same in lowered position, and a lever handle operatively connected with said supporting plate and operative in the act of moving said carriage in opposite directions to raise the supporting plate against the tension of said spring, and to exert pressure thereon in its lowered position.

14. In a machine of the character described, the combination of a table, a spindle mounted beneath said table, a plurality of circular saws mounted in predetermined spaced relation along said spindle, a portion of the saw blades extending through slots in the table surface, a carriage movable above the surface of the table parallel with the planes of said saws, and comprising a supporting plate suspended therefrom, a plurality of pusher plates mounted on said plate and arranged in alignment with the spaces between said saws, springs acting on said supporting plate to hold the same in lowered position, and a lever mounted on said carriage and operative in the act of moving said carriage in opposite directions to raise the supporting plate against the tension of said springs, and to exert pressure thereon in its lowered position.

15. In a machine of the character described, the combination of a table, a spindle mounted adjacent said table, a plurality of circular saws mounted in predetermined spaced relation along said spindle, a carriage slidably mounted above the surface of the table, and comprising a supporting plate depending from said carriage, a plurality of pusher plates secured to the supporting plate, and corresponding to the spaces between said saws, and a lever handle adapted to be grasped to the carriage in opposite directions, and operatively connected to said supporting plate through the medium of a rock shaft and supporting at their ends a rod carrying yieldable connecting members secured to said supporting plates, and means interposed between said rod and supporting plate for transmitting pressure indirectly thereto.

16. In a machine of the character described, the combination of a table, a spindle mounted beneath said table, a plurality of circular saws mounted in predetermined spaced relation along said spindle, a portion of the saw blades extending through slots in the table surface, a carriage movable above the surface of the table parallel with the planes of said saws, and comprising a supporting plate depending loosely from said carriage above the table surface, a plurality of pusher plates secured to the supporting plate and corresponding to the spaces between said saws, a lever arm pivoted at one end to said carriage, and resting at its opposite end upon said supporting plate, and a lever handle adapted to be grasped to move the carriage in opposite directions, and operatively connected to said supporting plate through the medium of a rock shaft and supporting at their ends a rod carrying vertically slidable bolts anchored in said supporting plates, and surrounded by coil springs bearing against said plate and said rod, the latter being positioned to engage a notch formed in said lever arm intermediate its ends when said supporting plate is lowered in brick engaging position, whereby the pressure on said plate is transmitted thereto indirectly through said lever arm.

17. In a machine of the character described, the combination of a table, a spindle beneath said table, a plurality of circular saws mounted in predetermined spaced relation along said spindle, a portion of the saw blades extending through slots in the table surface, a carriage movable above the surface of the table parallel with the planes of said saws, and comprising brick engaging members suspended therefrom and consisting of a series of pusher plates located in horizontal alignment with the spaces between said saws, and a lever shiftable relative to said carriage in the movement thereof in opposite directions to raise and lower said plates from and into brick engaging position, and means interposed between said lever and pusher plates for exerting pressure indirectly to said plates.

In witness whereof, I hereunto subscribe my name this 11th day of July, A. D., 1921.

WILLIAM C. WALSH.